(12) United States Patent
Karaikurichi

(10) Patent No.: US 7,062,341 B1
(45) Date of Patent: Jun. 13, 2006

(54) MECHANICAL DESIGN ASSEMBLY TRANSLATION INCLUDING PRESERVATION OF ASSEMBLY CONSTRAINTS/ASSOCIATIVITY

(75) Inventor: Sunderarajan G. Karaikurichi, Tualatin, OR (US)

(73) Assignee: Autodesk, Inc., San Rafael, CA (US)

( * ) Notice: Subject to any disclaimer, the term of this patent is extended or adjusted under 35 U.S.C. 154(b) by 968 days.

(21) Appl. No.: 09/757,326

(22) Filed: Jan. 9, 2001

(51) Int. Cl.
  *G06F 19/00* (2006.01)
(52) U.S. Cl. ........................................ 700/97; 700/103
(58) Field of Classification Search ................. 700/95, 700/97, 98, 103, 182, 108, 109, 110, 183, 700/184, 185, 115, 116, 52; 706/919; 345/964, 345/672; 705/22, 28
See application file for complete search history.

(56) References Cited

U.S. PATENT DOCUMENTS

| | | | |
|---|---|---|---|
| 4,872,105 A * | 10/1989 | Mozayeny | 700/61 |
| 5,410,496 A * | 4/1995 | Bolon et al. | 700/182 |
| 6,473,673 B1 * | 10/2002 | Kleyman et al. | 700/182 |
| 2003/0156127 A1 * | 8/2003 | Kleyman | 345/672 |

* cited by examiner

*Primary Examiner*—Leo Picard
*Assistant Examiner*—Charles Kasenge
(74) *Attorney, Agent, or Firm*—Fish & Richardson P.C.

(57) ABSTRACT

A computer-aid mechanical design software is provided with a mechanical design assembly translator that first translates first representations of parts of sub-assemblies of a mechanical design assembly to second translated representations of the parts of the sub-assemblies of the mechanical design assembly. The assembly translator thereafter translates one or more assembly constraints of the assembly by correspondingly constraining geometric entities within the translated representations that are counterpart to geometric entities within the pre-translation representations constrained by the one or more assembly constraints. The assembly translator is equipped to identify the corresponding geometric entities within the post-translation representations to be constrained.

9 Claims, 9 Drawing Sheets

500

MECHANICAL DESIGN ASSEMBLY TRANSLATION INCLUDING PRESERVATION OF ASSEMBLY CONSTRAINTS/ASSOCIATIVITY

BACKGROUND OF THE INVENTION

1. Field of the Invention

The present invention relates to the field of computer aided design (CAD). More specifically, the present invention relates to methods and apparatuses for translating mechanical design assemblies (including their constraints or associativity) from one representation to another.

2. Background Information

With the advance of computing technology, mechanical designers have long since turned to computer-aided design (CAD) software to assist them in designing ever more complex mechanical designs. To-date, numerous CAD software are available from different vendors. Examples of these CAD software include but are not limited to SolidWorks ProEngineer and Mechanical Desktop available from Autodesk, Inc. of San Rafael of CA, assignee of the present invention.

With the proliferation of the different CAD software available in the marketplace, mechanical designers (typically of different organizations) often find themselves having to translate the mechanical designs of each other, as they collaborate and share their designs. The reason being, even though fundamentally all CAD software use geometric primitives and solid modeling (in the case of 3D parts) to describe mechanical parts, but different vendors employ different data formats and/or organizations, as well as different modeling approaches. That is, different CAD software will model a geometry, such as a line, with different number of geometric primitives of different kinds, or a solid, such as a 3D cylinder, with different solid models. As a result, the process of translation involves not only conversion from one data format/organization to another, but also from one modeling approach to another. Thus, in the translation of a 2D geometry, such as a line, more or less geometric primitives (potentially of different kinds) may result, and in the translation of a 3D solid, typically, a solid model is approximated by a collection of surface geometric entities instead.

As a result of the ever increasing need for mechanical designers to collaborate and share their designs, numerous data interchange formats and part translation techniques, tools and utilities are known in the art. However, in the real world, increasingly mechanical designers are working with assemblies that are made up of ever increasing number of parts. Further, these assemblies have assembly constraints or associativity (hereinafter, simply constraints), such as one sub-assembly or part is to "mate" with another in a particular manner, other sub-assemblies or parts are to be "flushed" with each other, and so forth, as the sub-assemblies and parts are joined together to form the assemblies. Thus, having only parts translation is no longer sufficient for mechanical designers dealing with complex assemblies having a large number of sub-assemblies and/or parts, as well as assembly constraints. What is needed is an effective approach to assist mechanical designers in translating assemblies in substantially their entirety.

SUMMARY OF THE INVENTION

A constraint translator first determine geometry entities within a number of translated representations of sub-assemblies/parts of a mechanical design assembly corresponding to geometric entities within a number of pre-translation representations of the sub-assemblies/parts of the mechanical design assembly, constrained by one or more assembly constraints of the mechanical design assembly. The constraint translator then correspondingly constrains the determined counterpart sub-assemblies/parts of which the determined geometric entities within the translated representations are part of to effectively translate the one or more assembly constraints of the mechanical design assembly.

In one embodiment, the assembly constraint translator is provided as a component of an assembly translator. The assembly translator first invokes a part translator to translate the parts of the sub-assemblies of a mechanical design assembly, and thereafter invokes the assembly constraint translator to translate the assembly constraints as summarized above.

In one embodiment, the assembly translator, together with the part and constraint translators are provided as an integral part of a computer-aided mechanical design software.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, data structures, determining, constraining, and the like, consistent with the manner commonly employed by those skilled in the art to convey the substance of their work to others skilled in the art. As well understood by those skilled in the art, the quantities of these operations and the operations themselves take the form of electrical, magnetic, or optical signals capable of being stored, transferred, combined, and otherwise manipulated through mechanical and electrical components of the computer system. Moreover, the term computer system as used herein includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of their presentation. The phrase "in one embodiment" will be employed from time to time, and it is not intended to necessarily refer to the same embodiment, although it may.

Figure 1:
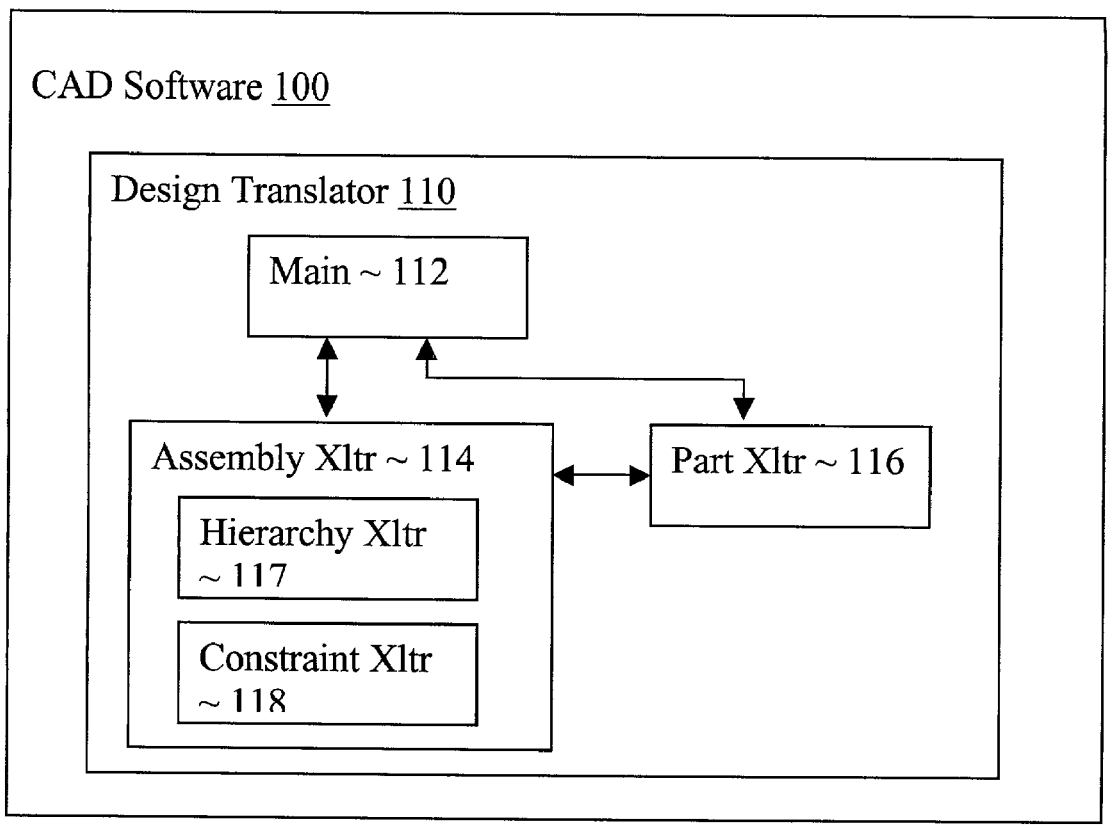
FIG. 1 illustrates a CAD software incorporated with the teachings of the present invention, in accordance with one embodiment.

Referring now FIG. 1, wherein a block diagram illustrating an example CAD software incorporated with teachings of the present invention is shown. As illustrated, CAD software 100 is advantageously provided with constraint translator 118 for translating constraints of a mechanical design assembly having a number of sub-assemblies and/or parts, and one or more assembly constraints. For the illustrated embodiment, constraint translator 118 is advantageously provided in conjunction with hierarchy translator 117, as components of assembly translator 114, which itself is provided in conjunction with main 112 and parts translator 116, forming design translator 110. Together, the elements of design translator 110 cooperate with each other to effectuate the desired automated translation of a mechanical design assembly having a number of sub-assemblies and/or parts, and one or more assembly constraints.

Except for the incorporation of constraint translator 118, in conjunction with hierarchy translator 114, forming assembly translator 114, and in conjunction with main 112 and parts translator 116, forming design translator 110, CAD software 100 including part translator 116 are intended to represent a broad range of these elements known in the art. Their constitutions and operations are known in the art, and will not be otherwise further described. Main 112, assembly translator 114, including hierarchy translator 117 and constraint translator 118, will be described in more details in turn below.

Figure 2:
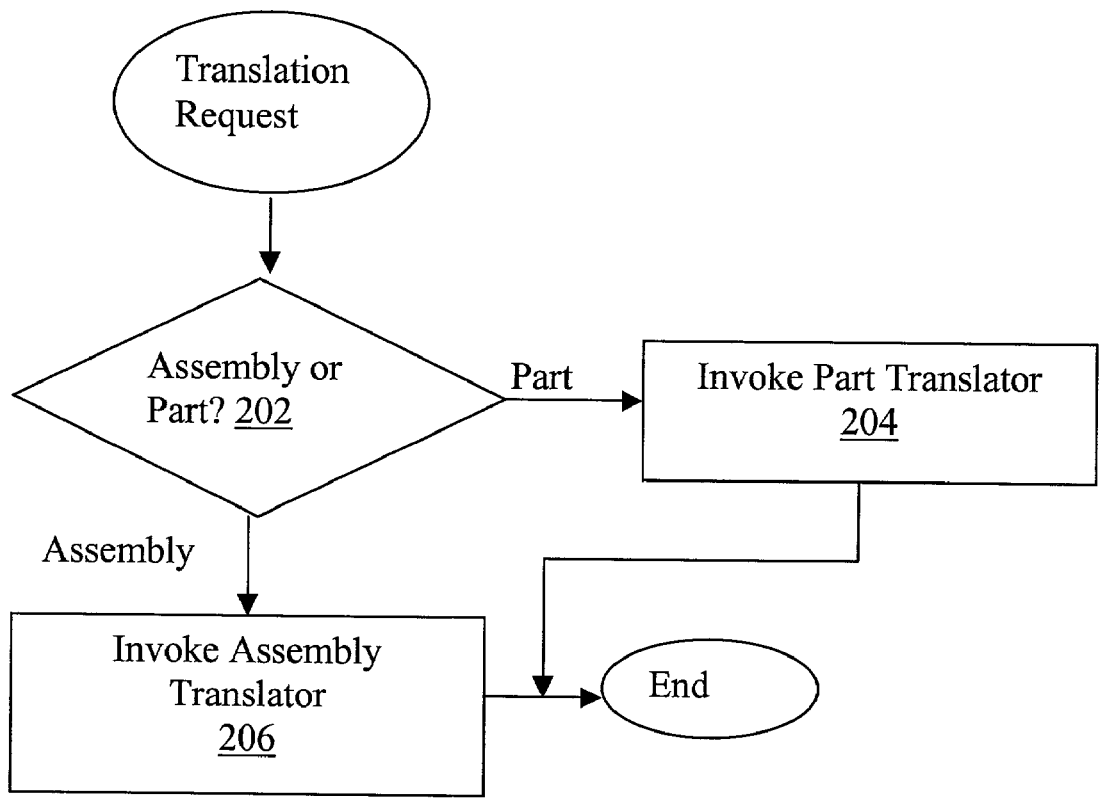
FIG. 2 illustrates the relevant operational flow of the main routine of FIG. 1, in accordance with one embodiment.

FIG. 2 is a flow chart illustrating the relevant aspects of the operational flow of main 112, in accordance with one embodiment. As illustrated, main 112 is provided primarily to allow design translator 110 to be advantageously used for conventional translation of parts, as well as for the novel automated translation of a mechanical design assembly having a number of sub-assemblies and/or parts, and one or more assembly constraints. Upon receipt of a request for translation, main 112 determines if the request is for the translation of a part or the translation of an assembly, block 202, and invokes parts translator 116 or assembly translator 114 accordingly, block 204 or 206. Conveyance of the request, and denoting of the request type, may be made in any one of a number of techniques known in the art, including but are not limited to messaging, event notification, parameter passing, control register setting, and the like.

Figure 3A:
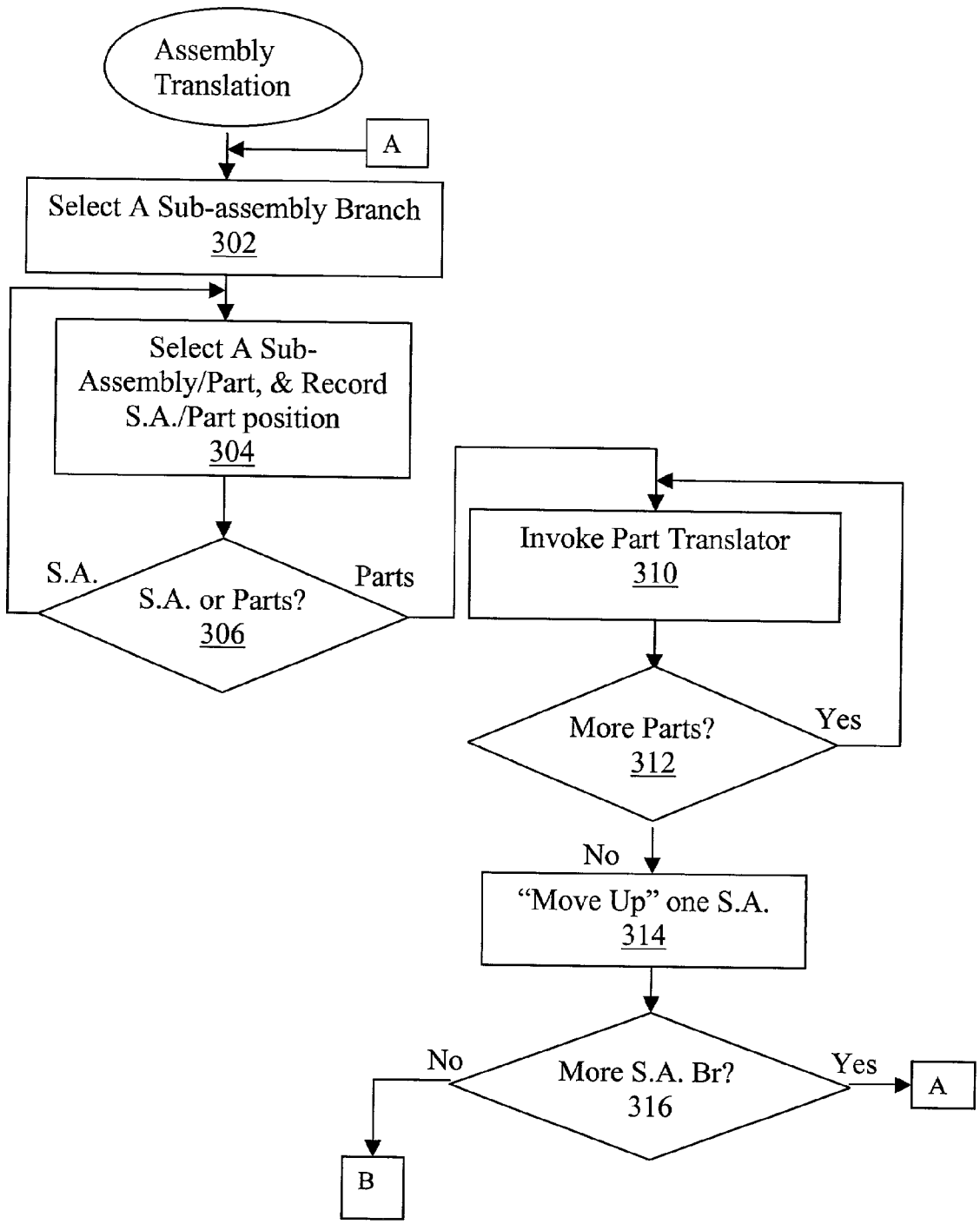
FIGS. 3a–3b illustrate the relevant operational flow of the assembly translator of FIG. 1, in accordance with one embodiment.
Figure 3B:
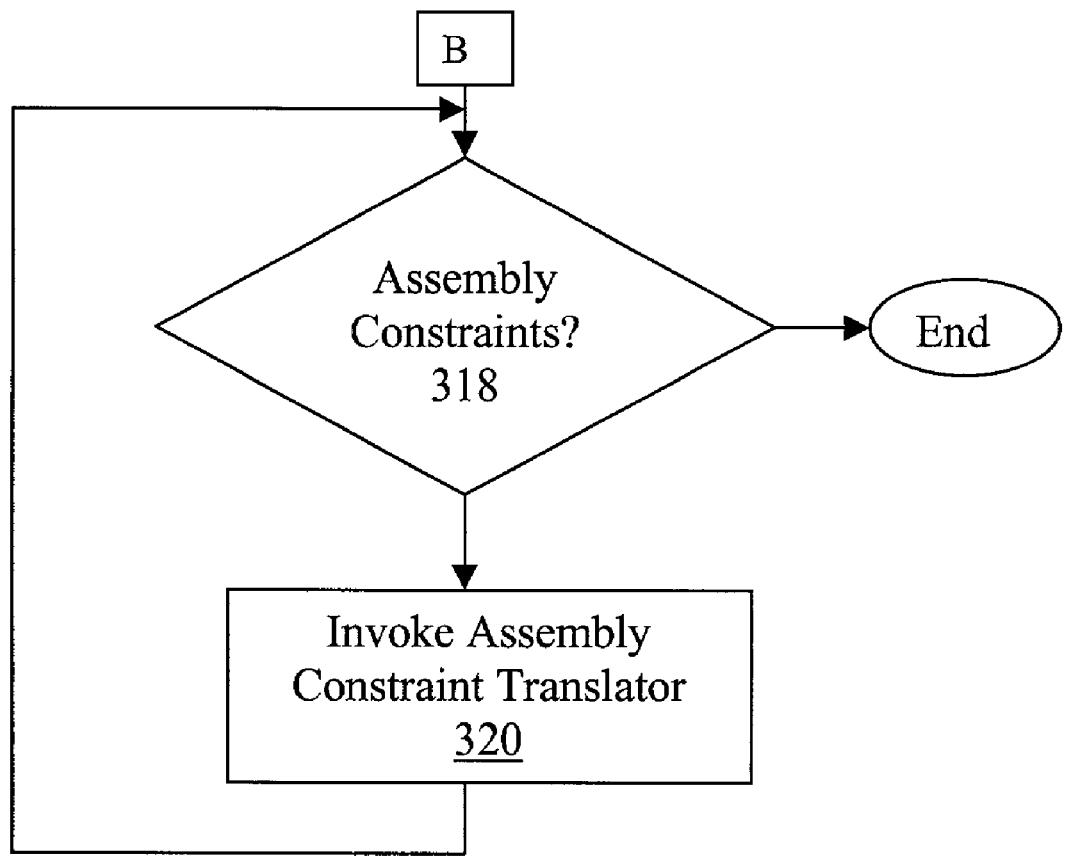

FIG. 3 is a flow chart illustrating the relevant aspects of the operational flow of assembly translator 112, more specifically, hierarchy translator 117. As illustrated, upon invocation, hierarchy translator 117, selects a sub-assembly branch of the mechanical design assembly (e.g. the sub-assembly branch originating from sub-assembly 404a or sub-assembly 404b of example mechanical design assembly 400 of FIG. 4), block 302. It is unimportant which sub-assembly branch get selected first. In one embodiment, hierarchy translator 117 follows a pre-determined "left-to-right" order, in another, hierarchy translator 117 follows a pre-determined "right-to-left" order. [Those skilled in the art will appreciate that "left-to-right" and "right-to-left" are merely shorthand references for ease of understanding. During operation, hierarchy translator 117 basically processes the different corresponding "segments" of the data structure iteratively, "segment" by "segment". See e.g. example data structure 410 of FIG. 4b having data "segments" 412.].

At block 304, hierarchy translator 117 selects the "next" sub-assembly/part of the selected sub-assembly branch (e.g. sub-assembly 404a, if hierarchy translator 117 is processing from "left-to-right"), records its spatial position in the mechanical design assembly. At block 306, hierarchy translator 117 determines if the selected "next" sub-assembly/part is a sub-assembly or a part. If the selected "next" sub-assembly/part is a sub-assembly, the process continues at block 304 and then block 306 again. That is, hierarchy translator 117 selects the "next" sub-assembly/part of the selected sub-assembly branch, records its spatial position in the mechanical design assembly, and determines if the selected "next" sub-assembly/part is a sub-assembly or a part. Eventually, hierarchy translator 117 will determine at block 306 that the selected "next" sub-assembly/part is a part. The process then continues at block 310.

At block 310, hierarchy translator 117 invokes parts translator 114 to translate the selected part. As alluded to earlier, translation not only includes conversion of the data format and/or organization being used, but typically also includes a change in the modeling approach being used. In particular, for 3D objects, most likely, solid representations will be generated. At block 312, hierarchy translator 117 determines if more parts are to be translated for this particular "location" of the assembly hierarchy. If more parts are to be translated, the process continues at block 310, otherwise the process continues at block 312, where hierarchy translator 117 "moves up" one hierarchical level of the assembly hierarchy, and determines if there are additional "sub-assembly" branch segments to be analyzed, block 314. If one or more "sub-assembly" branch segments are still be to be analyzed, the process continues back at block 302, and if all "sub-assembly" branch segments have been processed, the process continues at block 318.

At block 318, hierarchy translator 117 invokes constraint translator 118 to translate the assembly constraints of the mechanical design assembly. Hierarchy translator 117 repeats block 318 as long as there are assembly constraints to be translated, block 320.

Figure 4A:
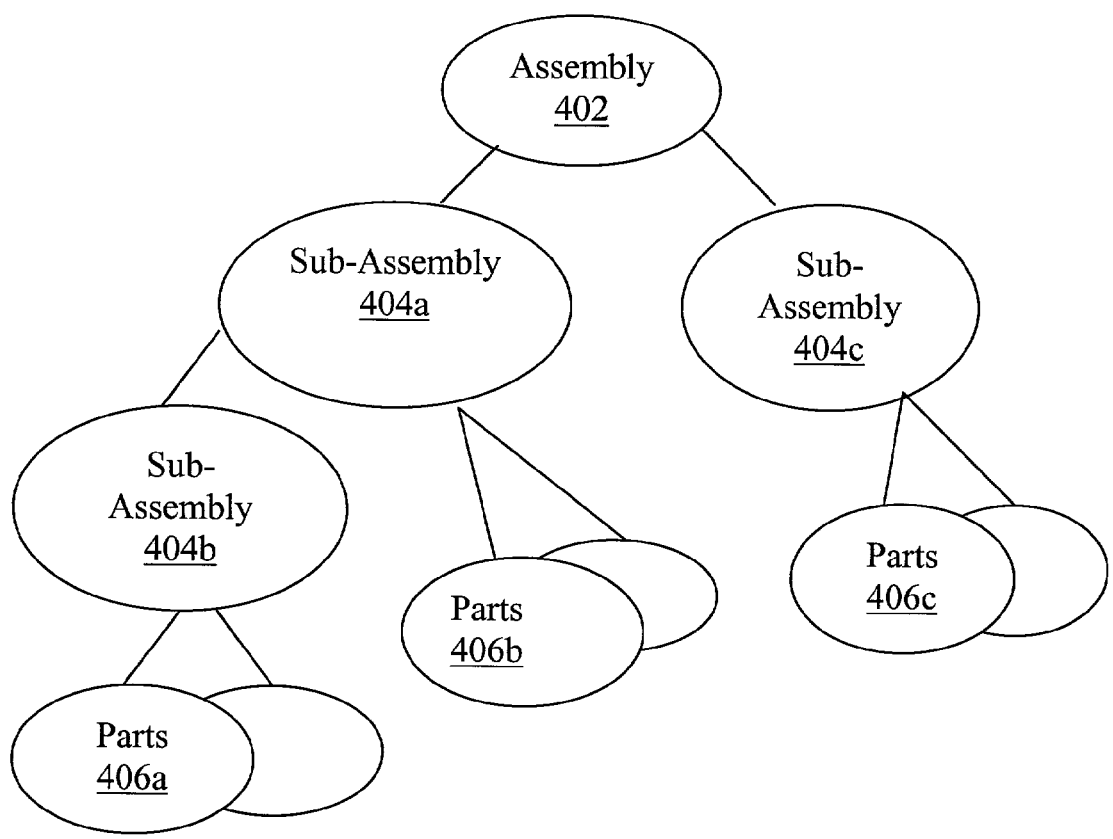
FIGS. 4a–4b illustrate an example hierarchical representation of an example assembly, and an example data structure for describing the example hierarchical representation of the example assembly, in accordance with one embodiment.

As alluded to earlier, FIG. 4a illustrates an example hierarchical representation 402 of an example mechanical design having a number of sub-assemblies 404a–404c, and some of the sub-assemblies, e.g. sub-assembly 404a, having additional sub-assemblies, e.g. sub-assembly 404b, while others include one or more parts, e.g. parts 406a–406c. Note that hierarchy 402 represents the assembly's sub-assemblies and parts hierarchical relationship in its pre-translation as well as post-translation state. In other words, while translation alters the data format and/or organization, translation does not fundamentally alter the number of "entities"

employed to model an assembly, and the hierarchical relationship between the existing sub-assemblies and parts.

Figure 4B:
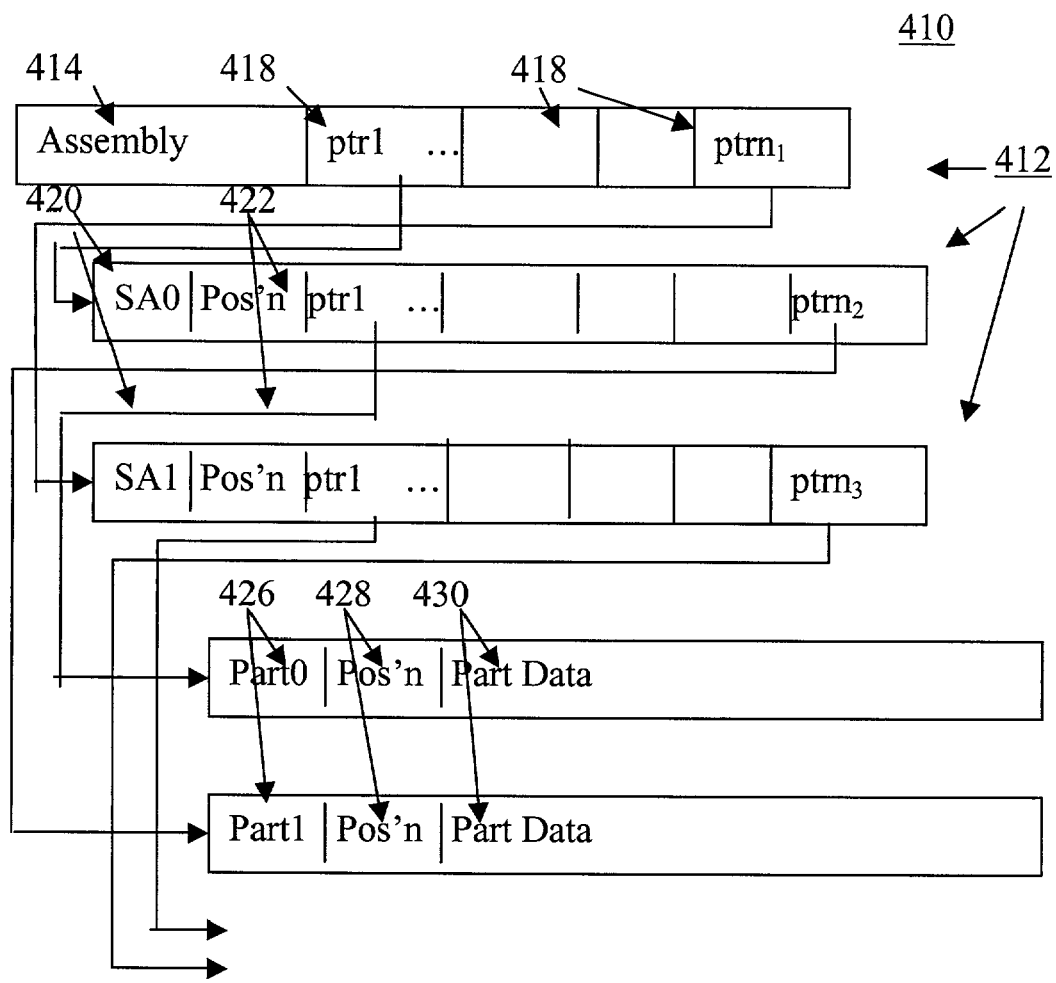

FIG. 4b illustrates an example corresponding data structure 410 having a number of data segments 412 suitable for use to describe an assembly hierarchy, in accordance with one embodiment. For the illustrated embodiment, each data segment 412 includes an assembly, sub-assembly or part identifier 414, 420 or 426. Additionally, for the sub-assembly and part data segments 412, each data segment 412 further includes a spatial location 422 or 428 of the sub-assembly/part in the assembly. For the assembly and sub-assembly data segments 412, each data segment 412 also includes one or more pointers 418 pointing to the immediately constituting sub-assemblies or parts. For the parts data segments 412, each data segment 412 also includes data describing the parts or parts data 430.

Example data structure 410 may be used to store the sub-assembly and parts data of the assembly in their pre-translation or post-translation state.

Figure 5:
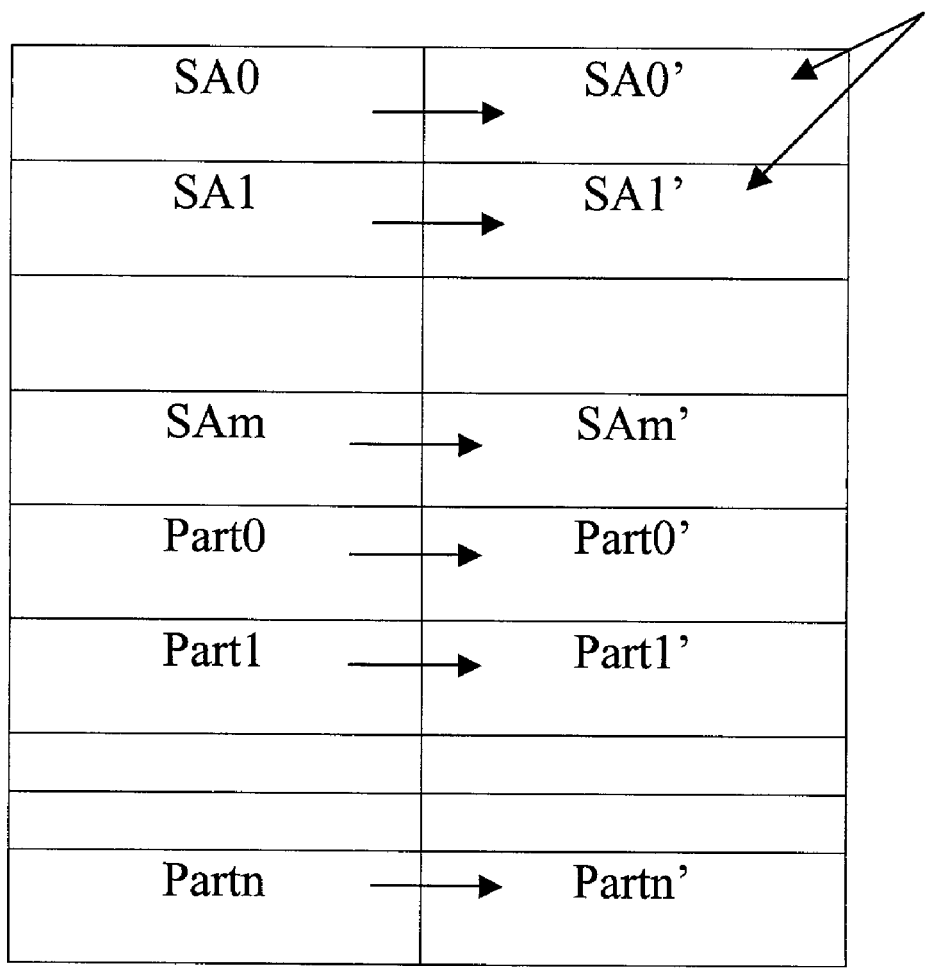
FIG. 5 illustrates an example data structure for tracking the correspondence between the pre-translation and translated representations of the sub-assemblies and parts, in accordance with one embodiment.

For the illustrated embodiment, an example mapping data structure, such as table 500 of FIG. 5 having a number of mapping entries such as entries 502 is used to track the correspondence between the pre-translation and post-translation representations of the sub-assemblies and parts. Note that while the representations, such as parts data 430 may be different before and after translation, nevertheless, there is a one-to-one correspondence between a pre-translation representation and a post-translation representation of an existing sub-assembly/part.

Figure 6:
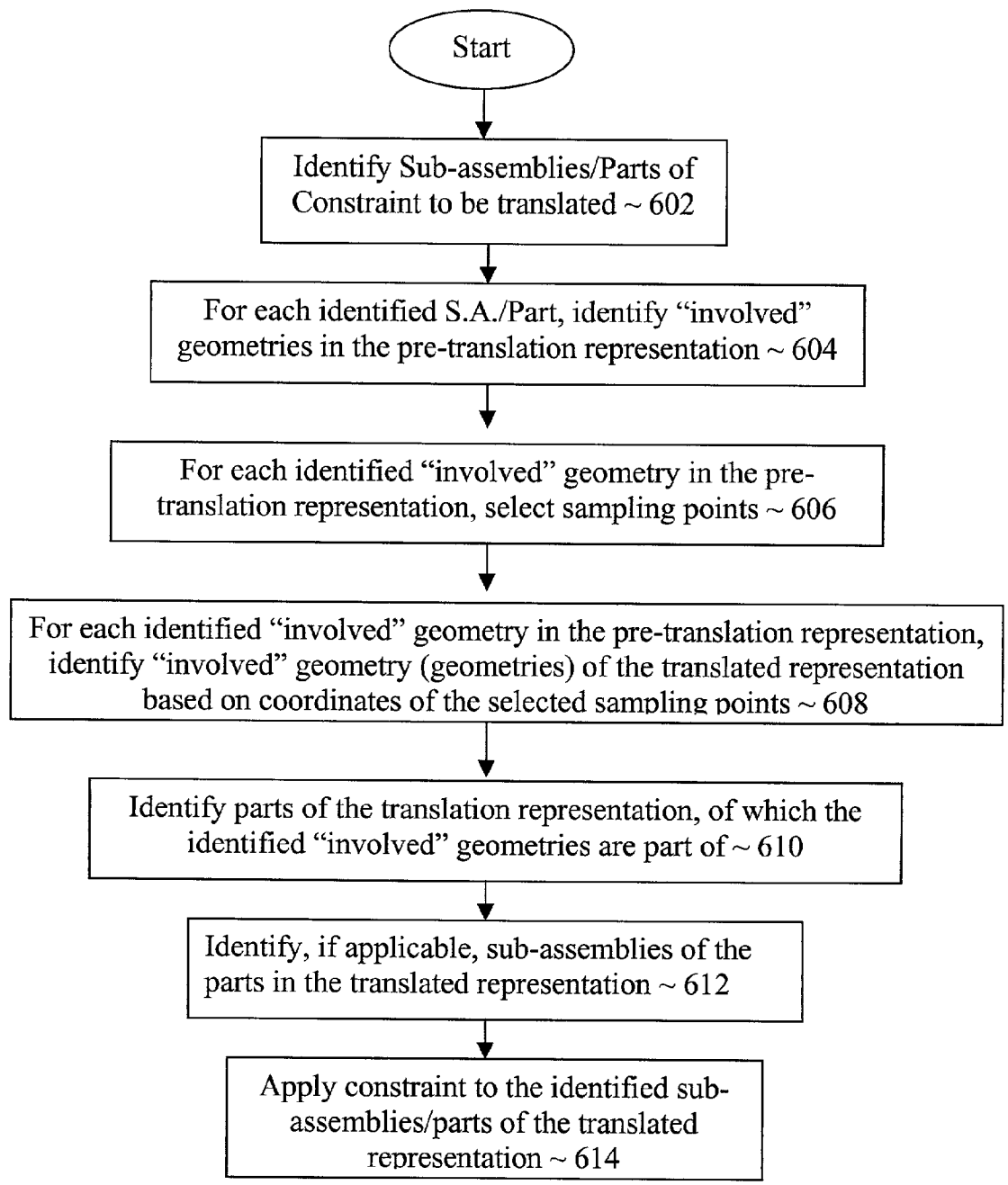
FIG. 6 illustrates the relevant operational flow of the constraint translator of FIG. 1, in accordance with one embodiment.

FIG. 6 illustrates the relevant operation flow of constraint translator 118 for translating assembly constraints of the assembly, in accordance with one embodiment. For each assembly constraint, the process starts at block 602 where constraint translator 118 first identifies the "involved" sub-assemblies/parts, that is, the sub-assemblies/parts constrained by the particular assembly constraint. As described earlier, examples of assembly constraints include but are not limited to "mate", "flush", "angle" and "rotation" constraints. At block 604, constraint translator 118 determines, for each "involved" sub-assembly/part, the geometry elements (or entities) in the pre-translation representation that are actually constrained by the particular assembly constraint. At block 606, constraint translator 118 determines, for each of the actually constrained geometry elements (or entities), a number of sampling points, and their coordinates. Sampling points may be selected based on a number of empirically pre-determined approaches. For example, the sampling points may be selected by always including the vertices and the centroid of a geometry element. Additionally, the number of sampling points may be employed to ensure certain sampling point density is achieved. The additional sampling points to increase the sampling point density may be the additional centroids of the different systematically partitioned areas of a geometry element. Determination of the vertices and the centroid of a geometry element as well as the partitioning of a geometry element are known in the art, accordingly will not be further described.

At block 608, constraint translator 118 determines, for each of the actually constrained geometry elements (or entities), their corresponding geometry element or elements (or entity/entities), using the selected sampling points, more specifically the coordinates of the selected sampling points. At block 610, upon identifying the corresponding geometry element or elements (or entity/entities), constraint translator 118 identifies the parts in the translated representation modeled (in whole or in part) by the identified constrained geometry elements of the translated representation. At block 612, if applicable, constraint translator 118 further identifies the sub-assemblies of the translated representation to which the identified parts of the translated representation are members of. At block 614, constraint translator 118 applies the constraints to the identify geometry element/elements (entity/entities) of the corresponding sub-assemblies/parts, effectively translating the assembly constraint.

Process 600 is repeated by constraint translator 118 for each assembly constraint.

Figure 7:
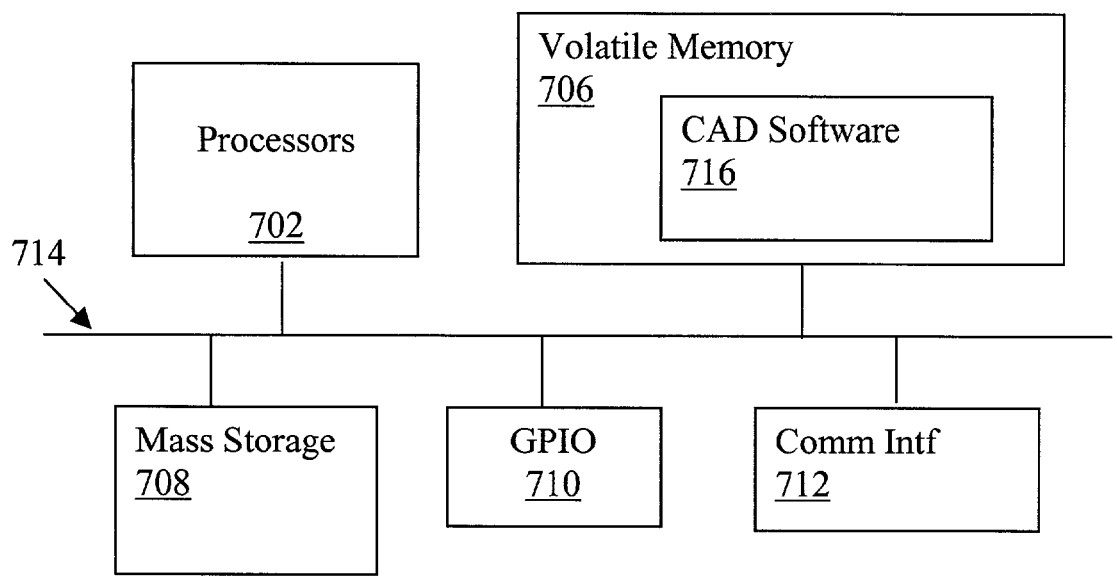
FIG. 7 illustrates one embodiment of an example computer system suitable for programming with instructions implementing the present invention.

FIG. 7 illustrates one embodiment of a computer system suitable to be programmed with programming instructions implementing the CAD software incorporated with the constraint translator and other aspects of the present invention. As illustrated, computer system 700 includes one or more processors 702 and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements perform its conventional functions known in the art. In particular, system memory 704 and mass storage 706 are employed to store a working copy and a permanent copy of the programming instructions implementing the teachings of the present invention. The permanent copy of the programming instructions may be loaded into mass storage 706 in the factory, or in the field, as described earlier, through a distribution medium (not shown) or through communication interface 710 (from a distribution server (not shown). The constitution of these elements 702–712 are known, and accordingly will not be further described.

Thus, a method and an apparatus for translating a mechanical design assembly including its assembly constraints in an automated manner have been described. Those skilled in the art will recognize that the present invention is not limited by the details described, instead, the present invention can be practiced with modifications and alterations within the spirit and scope of the appended claims. The description is thus to be regarded as illustrative instead of restrictive on the present invention.

What is claimed is:

1. A computer implemented method comprising:
   translating a first representation of parts or sub-assemblies of a mechanical design assembly into a second, different representation of the parts or sub-assemblies of the mechanical design assembly; and
   thereafter, translating one or more assembly constraints of the mechanical design assembly, where each assembly constraint defines an association between two or more parts or sub-assemblies of the mechanical design assembly and where translating assembly constraints includes converting a data format of the assembly constraints from a first format of a first design system to a second, different format of a second, different design system; and
   wherein said translating of one or more assembly constraints comprises identifying geometric entities within said translated representations that are counterpart to geometric entities of said pre-translation representations constrained by said one or more assembly constraints and correspondingly constraining said counterpart geometric entities within said translated representations; and wherein said identifying comprises:
identifying said geometric entities within said pre-translated representations constrained by said one or more assembly constraints;
selecting a plurality of spatial sampling points for each of said identified geometric entities within said pre-translation representations, and
for each of said identified geometric entities within said pre-translation representations, applying the selected spatial sampling points to corresponding geometric entities within said translated representations to identify the counterpart geometric entities.

2. An article of manufacture comprising:
a recordable medium having recorded thereon a plurality of machine executable programming instructions designed to program a host machine to enable the host machine to
translate a first representation of parts or subassemblies of a mechanical design assembly into a second, different representation of the parts or sub-assemblies of the mechanical design assembly; and
thereafter, translate one or more assembly constraints of said assembly, where each assembly constraint defines an association between two or more parts or sub-assemblies of the mechanical design assembly and where translating assembly constraints includes converting a data format of the assembly constraints from a first format of a first design system to a second, different format of a second, different design system; and
wherein said programming instructions enable the host machine to:
identify geometric entities within said translated representations that are counterpart to geometric entities of said pre-translation representations constrained by said one or more assembly constraints and
correspondingly constraining said counterpart geometric entities within said translated representations; and
wherein said programming instructions further enable the host machine to:
identify said geometric entities within said pre-translated representations constrained by said one or more assembly constraints,
select a plurality of spatial sampling points for each of said identified geometric entities within said pre-translation representations, and
for each of said identified geometric entities within said pre-translation representations, apply the selected spatial sampling points to corresponding geometric entities within said translated representations to identify the counterpart geometric entities.

3. A computer system comprising:
a storage medium having stored therein a plurality of programming instructions to translate a first representation of parts or sub-assemblies of a mechanical design assembly into a second, different representation of the parts or sub-assemblies of the mechanical design assembly, and thereafter, translate one or more assembly constraints of said assembly, where each assembly count defines an association between two or more parts or sub-assemblies of the mechanical design assembly and where translating assembly constraints includes converting a data format of the assembly constraints from a first format of a first design system to a second, different format of a second, different design system; and a processor coupled to the storage medium to execute the programming instructions; and
wherein said programming instructions are designed to:
identify geometric entities within said translated representation that are counterpart to geometric entities of said pre-translation representations constrained by said one or more assembly constraints and
correspondingly constraining said counterpart geometric entities within said translated representations; and
wherein said programming instructions are designed to:
identify said geometric entities within said pre-translated representations constrained by said one or more assembly constraints;
select a plurality of spatial sampling points for each of said identified geometric entities within said pre-translation representations, and
for each of said identified geometric entities within said pre-translation representations, apply the selected spatial sampling points to corresponding geometric entities within said translated representations to identity the counterpart geometric entities.

4. A method comprising:
determining geometric entities within a plurality of translated representations of sub-assemblies and/or parts of a mechanical design assembly that are corresponding to geometric entities within a plurality of pre-translation representations of the subassemblies and/or parts of the mechanical design assembly, that are constrained by one or more assembly constraints of the mechanical design assembly, each assembly constraint defining an association between two or more parts or sub-assemblies of the assembly; and
correspondingly constraining the determined counterpart geometric entities within the translated representations of the sub-assemblies and/or parts to; and
wherein said determining comprises:
identifying said geometric entities within said pre-translated representations constrained by said one or more assembly constraints;
selecting a plurality of spatial sampling points for each of said identified geometric entities within said pre-translation representations, and
for each of said identified geometric entities within said pre-translation representations, applying the selected spatial sampling points to corresponding geometric entities within said translated representations to identify the counterpart geometric entities.

5. An article of manufacture comprising:
a recordable medium having recorded thereon a plurality of machine executable programming instructions designed to program a host machined to enable the host machine to:
determine geometric entities within a plurality of translated representations of sub-assemblies and/or parts of a mechanical design assembly that are corresponding to geometric entities within a plurality of pre-translation representations of the sub-assemblies and/or parts of the mechanical design assembly, that are constrained by one or more assembly constraints of the mechanical design assembly, each assembly constraint defining an association between two or more parts or sub-assemblies of the assembly; and
correspondingly constraining the determined counterpart geometric entities of the plurality of translated representations of the sub-assemblies and/or parts to effectively translate Said one or more assembly constraints of the mechanical design assembly; and wherein said programming instructions enable the host machine to:
  identify said geometric entities within said pre-translated representations constrained by said one or more assembly constraints;
  select a plurality of spatial sampling points for each of said identified geometric entities within said pre-translation representations, and
  for each of said identified geometric entities within said pre-translation representations, apply the selected spatial sampling points to geometric entities within said translated representations to identify the counterpart geometric entities.

6. A computer system comprising:
a storage medium having therein a plurality of programming instructions to determine geometric entities within a plurality of translated representations of sub-assemblies and/or parts of a mechanical design assembly that are corresponding to geometric entities within a plurality of pre-translation representations of the sub-assemblies and/or parts of the mechanical design assembly, that are constrained by one or more assembly constraints of the mechanical design assembly, each assembly constraint defining an association between two or more parts or sub-assemblies of the assembly, and correspondingly constraining the determined counterpart geometric entities of the plurality of translated representations of the sub-assemblies and/or parts to effectively translate said one or more assembly constraints of the mechanical design assembly; and
a processor coupled to the storage medium to execute the program instructions; and
wherein said programming instructions are designed to:
  identify said geometric entities within said pre-translated representations constrained by said one or more assembly constraints;
  select a plurality of spatial sampling points for each of said identified geometric entities within said pre-translation representations, and
  for each of said identified geometric entities within said pre-translation representations, apply the selected spatial sampling points to corresponding geometric entities within said translated representations to identify the counterpart geometric entities.

7. A computer implemented method comprising:
translating a first representation of parts or sub-assemblies of a mechanical design assembly into a second, different representation of the parts or sub-assemblies of the mechanical design assembly, and
thereafter, translating one or more assembly constraints of the mechanical design assembly, where each assembly constraint defines an association between two or more parts or sub-assemblies of the mechanical design assembly and where translating an assembly constraint includes: identifying one or more geometry elements in the first representation that are constrained by the assembly constraint, identifying one or more corresponding geometry elements in the second representation and applying the assembly constraint to the one or more corresponding geometry elements in the second representation;
wherein said identifying one or more corresponding geometry elements in the second representation comprises:
  selecting a plurality of spatial sampling points for each of said identified geometry elements within said pre-translation first representation, and
  for each of said identified geometry elements within said pre-translation first representation, using coordinates of the selected spatial sampling points to identify a corresponding geometry element within said translated second representation.

8. An article of manufacture comprising:
a recordable medium having recorded thereon a plurality of machine executable programming instructions designed to program a host machine to enable the host machine to:
  translate a first representation of parts or sub-assemblies of a mechanical design assembly into a second, different representation of the parts or sub-assemblies of the mechanical design assembly; and
  thereafter, translate one or more assembly constraints of said assembly, where each assembly constraint defines an association between two or more parts or sub-assemblies of the mechanical design assembly and where translating an assembly constraint includes: identifying one or more geometry elements in the first representation that are constrained by the assembly constraint, identifying one or more corresponding geometry elements in the second representation and applying the assembly constraint to the one or more corresponding geometry elements in the second representation;
wherein said programming instructions enable the host machine to:
  select a plurality of spatial sampling points for each of said identified geometry elements within said pre-translation first representation, and
  for each of said identified geometry elements within said pre-translation first representation, use coordinates of the selected spatial sampling points to identify the corresponding geometry elements within said translated second representation.

9. A computer system comprising:
a storage medium having stored therein a plurality of programming instructions to translate a first representation of part or sub-assemblies of a mechanical design assembly into a second, different representation of the parts or sub-assemblies of the mechanical design assembly, and thereafter, translate one or more assembly constraints of said assembly, where each assembly constraint defines an association between two or more parts or sub-assemblies of the mechanical design assembly and where translating an assembly constraint includes;
  identifying one or more geometry elements in the first representation that are constrained by the assembly constraint identifying one or more corresponding geometry elements in the second representation and applying the assembly constraint to the one or more corresponding geometry elements in the second representation; and
a processor coupled to the storage medium to execute the programming instructions;
wherein said programming instructions are designed to:
select a plurality of spatial sampling points for each of said identified geometry elements within said pre-translation first representation, and
for each of said identified geometry elements within said pre-translation first representation, use the selected spatial sampling points to identify the corresponding geometry elements within said translated second representation.

* * * * *

UNITED STATES PATENT AND TRADEMARK OFFICE
CERTIFICATE OF CORRECTION

| | | |
|---|---|---|
| PATENT NO. | : 7,062,341 B1 | |
| APPLICATION NO. | : 09/757326 | |
| DATED | : June 13, 2006 | |
| INVENTOR(S) | : Sunderarajan G. Karaikurichi | |

It is certified that error appears in the above-identified patent and that said Letters Patent is hereby corrected as shown below:

Column 7, Line 18 at Claim 2; replace:
    "representation of parts or subassemblies" with
    --representation of parts or sub-assemblies--

Column 7, Lines 44-45 at Claim 2; replace:
    "assembly constraints," with
    --assembly constraints;--

Column 7, Line 61 at Claim 3, replace:
    "count defines an association" with
    --constraint defines an association--

Column 8, Line 27 at Claim 4, replace:
    "representations of the subassemblies and/or" with
    --representations of the sub-assemblies and/or--

Column 8, Line 66 at Claim 5, replace:
    "translate Said one or" with
    --translate said one or more--

Column 9, Line 49 at Claim 7, replace:
    "design assembly, and" with
    --design assembly; and--

Column 10, Line 40 at Claim 9, replace:
    "of part or sub-assemblies" with
    --of parts or sub-assemblies--

Column 10, Line 48 at Claim 7, replace:
    "includes;" with
    --includes:--

UNITED STATES PATENT AND TRADEMARK OFFICE
CERTIFICATE OF CORRECTION

PATENT NO. : 7,062,341 B1
APPLICATION NO. : 09/757326
DATED : June 13, 2006
INVENTOR(S) : Sunderarajan G. Karaikurichi It is certified that error appears in the above-identified patent and that said Letters Patent is hereby corrected as shown below:

Column 10, Line 51 at Claim 9, replace:
    "constraint identifying one" with
    --constraint, identifying--

Signed and Sealed this

Twenty-eighth Day of August, 2007

JON W. DUDAS
*Director of the United States Patent and Trademark Office*